(No Model.) 2 Sheets—Sheet 1.
E. A. H. & C. R. G. RABIGER.
AWNING.
No. 338,875. Patented Mar. 30, 1886.
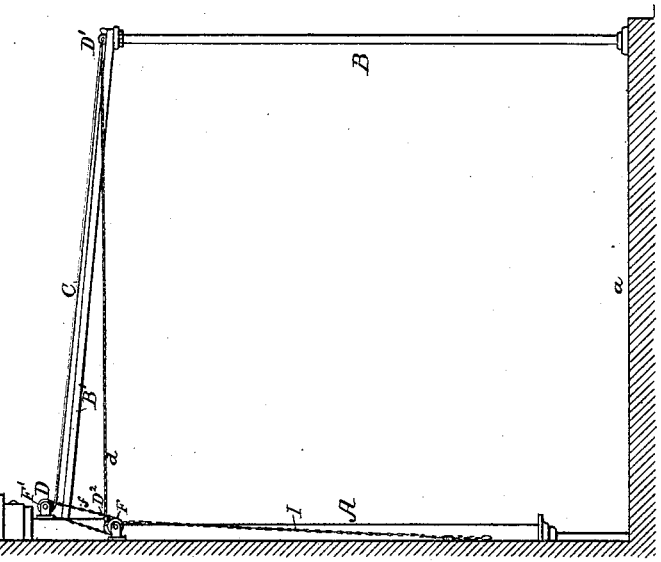
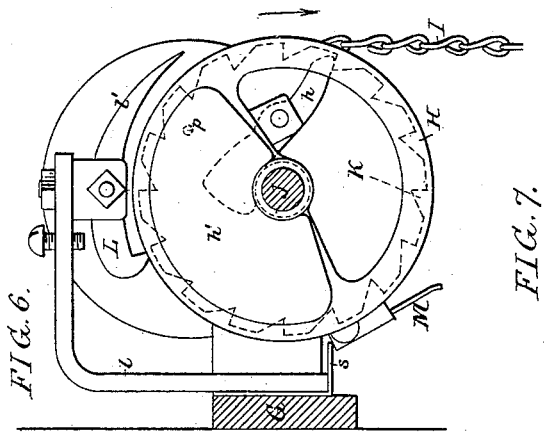
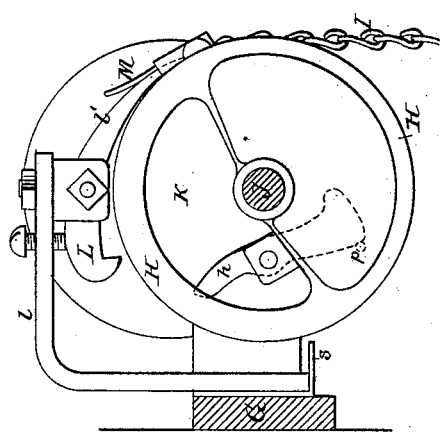
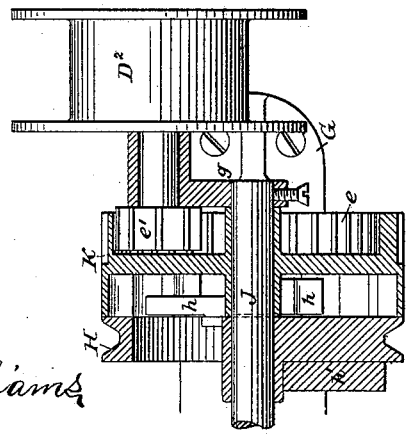
Witnesses:
David S. Williams
William F. Davis
Inventors:
E. A. H. Rabiger &
Charles R. G. Rabiger
by their Attorneys:
Howson & Sons (No Model.) 2 Sheets—Sheet 2.
E. A. H. & C. R. G. RABIGER.
AWNING.
No. 338,875. Patented Mar. 30, 1886.
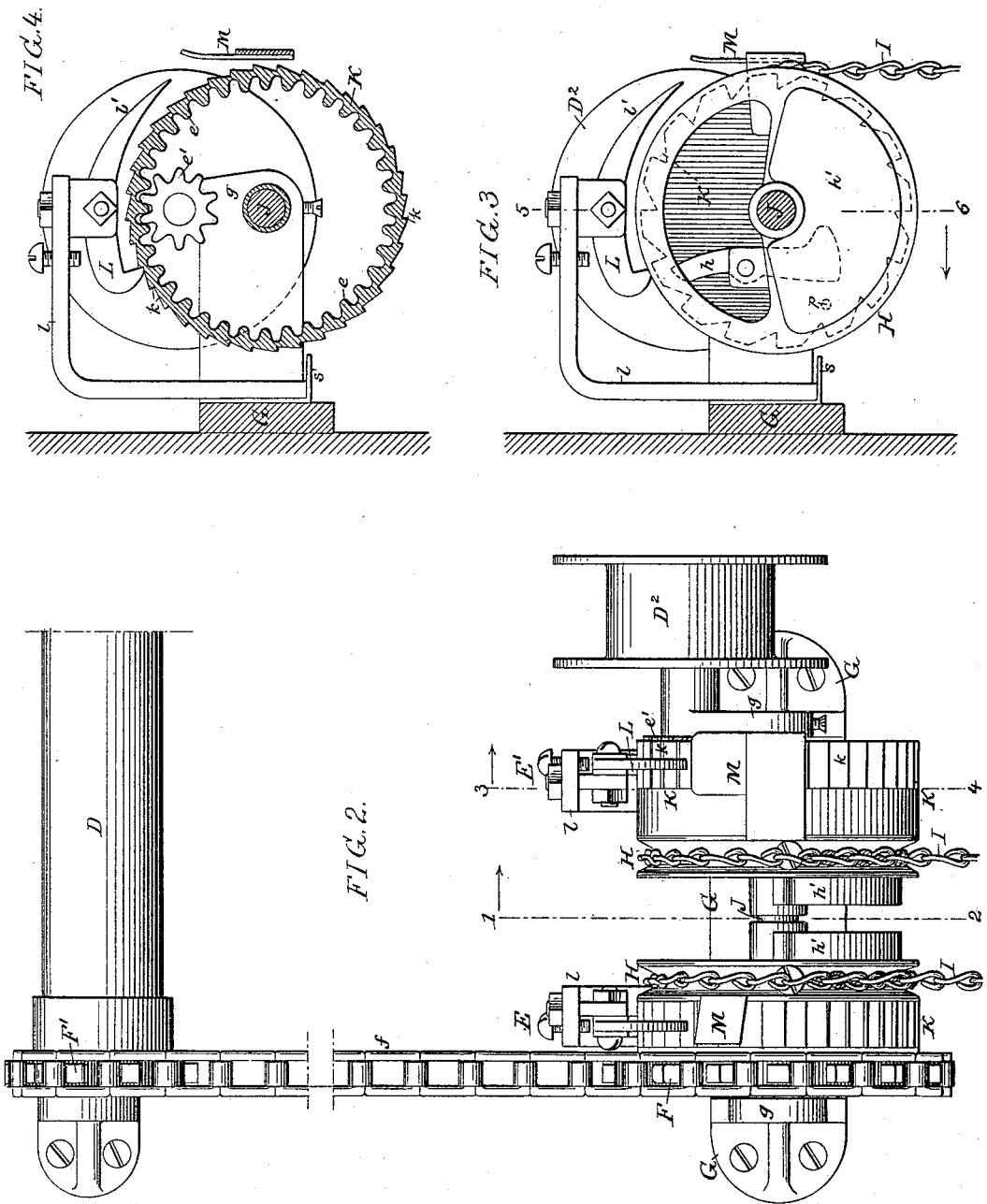
Witnesses:
David S. Williams
William F. Davis
Inventors:
E. A. H. Rabiger &
Charles R. G. Rabiger
by their Attorneys:
Howson & Sons

UNITED STATES PATENT OFFICE.

EMIL A. H. RABIGER AND C. ROBERT G. RABIGER, OF PHILADELPHIA, PA.

AWNING.

SPECIFICATION forming part of Letters Patent No. 338,875, dated March 30, 1886.

Application filed January 4, 1886. Serial No. 187,522. (No model.)

*To all whom it may concern:*

Be it known that we, EMIL A. H. RABIGER and CHARLES ROBERT G. RABIGER, both subjects of the Emperor of Germany, residing in Philadelphia, Pennsylvania, have invented certain Improvements in Mechanism for Raising and Lowerings Awnings, of which the following is a specification.

The main object of our invention is to construct a device for facilitating the raising and lowering of awnings, more especially of that class of canvas awnings which are used for the fronts of stores and which are extended over iron posts, and this object we attain as hereinafter described.

In the accompanying drawings, Figure 1 is a side elevation illustrating the application of our invention. Fig. 2 is a face view, drawn to a larger scale, of our operating devices. Fig. 3 is a transverse section on the line 1 2, Fig. 1. Fig. 4 is a transverse section on the line 3 4, Fig. 1. Fig. 5 is a section on the line 5 6, Fig. 3; and Figs. 6 and 7 are views similar to Fig. 3, but showing the parts in different positions.

Referring to Fig. 1, A represents the window-frame of the store; a, the sidewalk, and B one of the upright posts on the curbstone, while B' is one of the inclined rods connecting the upright posts with the front of the building.

C is the awning, which is adapted at one end to be rolled upon or unrolled from a roller, D, mounted in bearings in brackets on the window-frame or the wall-front, and at the other end is adapted to be wound up onto and unwound from a roller, D', mounted in bearings on the posts B. We provide a separate clutch, E and E', for each roller, the clutch E being geared to the upper roller, D, by means of a chain, belt, or band. In this instance we have shown a chain, f, passing over a chain-wheel, F, connected with the clutch E, and also over a chain-wheel, F', on the roller D. The lower roller, D', is connected with its clutch E' through the medium of a chain, cord, or band, d, Fig. 1, which passes over and has one end connected to a wheel or pulley, D², Fig. 2, this wheel or pulley being mounted in bearings in a bracket, G, which is affixed to the wall of the structure, and which carries the two clutches E and E'.

The two clutches in general construction are similar, as shown in the drawings, so that a description of one will apply to that of the other, except in the particulars hereinafter referred to. Each clutch, as illustrated more fully in Fig. 5, consists of two main parts—first, a weighted, H, carrying a weighted or spring pawl, h; and, secondly, a ratchet-wheel, K, which transmits motion to the rollers. All of these wheels and pulleys are free to turn on a shaft, J, secured in the arms g of the bracket G. The pulley H carries a weight, h', at one side, which tends to normally keep the pulley in the position illustrated in Fig. 3, and to this pulley is pivoted a weighted pawl, h, which is adapted to engage with the internal ratchet of the wheel K, the extent of motion of this weighted pawl on its pivot being limited in one direction by the hub of the wheel K, and in the other direction by a pin, p, on the pulley H. The pulley H is provided with a chain or cord, I, which is fastened at one end to the periphery of the pulley and extends down to any suitable point alongside the wall of the building within easy reach of the operator. By pulling on this chain intermittently and releasing it again, a rotary reciprocating motion will be imparted to the pulley, since at each forward movement the pawl h will engage with a tooth of the ratchet-wheel K to turn the latter, as indicated in Fig. 6. When the chain is released, the weight h' will cause the pulley to return to the position indicated in Fig. 3, ready for another feed movement. To prevent the pulley H from being pulled around beyond the point necessary for the return of the counter-weight h', a stop, s, is provided, and a projection on the pulley comes into contact with this stop, as illustrated in Fig. 6. Each ratchet-wheel K is provided with a pawl to prevent back movement, except when desired, and in the present instance this pawl L is mounted outside the wheel, so that a second set of ratchet-teeth, k, is formed on the outer periphery of the wheel, for engagement with the pawl L, which is pivoted on an arm, l, extending from the bracket G. The wheel K of the clutch E is affixed to or formed in one part with the chain-wheel F, hereinbefore referred to, for transmitting the intermittent rotary motion to the roller D, while the corresponding wheel, K, of the clutch E' is provided with an internal gear, e, with which engages a pinion, e', on the inner end of the shaft, which carries the flanged wheel D², for imparting the intermittent rotary motion to the roller D' of the awning.

In order that one clutch may be released when the other is to be operated, so that while the awning is rolled up onto one roller it may be unrolled from the other, each pawl is provided with a tail, $l'$, and each pulley H is provided with a finger, M, in such a position that when the pulley H is allowed to fly back from the position illustrated in Fig. 6, under the action of its counter-weight $h'$, the finger M will come into contact with the tail $l'$ and lift the latter out of contact with the teeth of the wheel K, as illustrated in Fig. 7, and at the same time the weighted pawl $h$ will be disengaged from the internal ratchet-teeth of the wheel K.

We claim as our invention—

1. The combination of a bracket, G, adapted to be secured to a wall of a building, with the upper and lower rollers, D D', of an awning, clutches E E', both carried by the bracket, and gearing between the clutches and the rollers, substantially as described.

2. The combination of the upper roller, D, and lower roller, D', of an awning, and a bracket carrying clutches E E', with a wheel, F, on the clutch E, and chain $f$, connecting it with the roller D and a pulley, D², and chain $d$, connecting the clutch E' with the roller D', all substantially as set forth.

3. The combination of the ratchet-wheel K, having internal and external teeth and a pawl for the external teeth, with a weighted pulley, H, having a pawl, $h$, within the wheel K, to engage with the internal teeth thereof, and stops for the pawl, as specified.

4. The combination of the ratchet-wheel K, having internal teeth and external teeth, with a pulley carrying a pawl to engage with the internal teeth, and a bracket carrying a pawl to engage with the external teeth, said pulley also carrying a finger, M, to disengage the outer pawl, substantially as set forth.

In testimony whereof we have signed our names to this specification in the presence of two subscribing witnesses.

EMIL A. H. RABIGER.
C. ROBERT G. RABIGER.

Witnesses:
WILLIAM D. CONNER,
HARRY SMITH.